United States Patent
Hikomoto

(10) Patent No.: US 7,212,781 B2
(45) Date of Patent: May 1, 2007

(54) MOBILE TERMINAL HAVING FUNCTIONS OF PROGRAM RECEPTION THROUGH BROADCASTING AND THROUGH NETWORK COMMUNICATION, AND PROGRAM RECEPTION CONTROLLING METHOD

(75) Inventor: Satomi Hikomoto, Higashihiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 223 days.

(21) Appl. No.: 10/510,634

(22) PCT Filed: Mar. 3, 2004

(86) PCT No.: PCT/JP2004/002684

§ 371 (c)(1),
(2), (4) Date: Oct. 8, 2004

(87) PCT Pub. No.: WO2004/080011

PCT Pub. Date: Sep. 16, 2004

(65) Prior Publication Data

US 2005/0153650 A1  Jul. 14, 2005

(30) Foreign Application Priority Data

Mar. 3, 2003  (JP)  ............................. 2003-056293

(51) Int. Cl.
- H04H 1/00 (2006.01)
- H04M 1/00 (2006.01)
- H04Q 7/00 (2006.01)

(52) U.S. Cl. ............... 455/3.01; 455/552.1; 455/553.1; 455/556.1; 370/331

(58) Field of Classification Search ............... 455/3.06, 455/552.1, 553.1, 556.1; 370/331
See application file for complete search history.

(56) References Cited

U.S. PATENT DOCUMENTS 5,822,324 A * 10/1998 Kostresti et al. ............ 370/487

(Continued)

FOREIGN PATENT DOCUMENTS

| EP | 1237302 A2 | 9/2002 |
|---|---|---|
| JP | 2002-189479 | 7/2002 |
| WO | 99/18684 | 4/1999 |

OTHER PUBLICATIONS

U. Horn et al., "Interactive mobile streaming services—the convergence of broadcast and mobile communication", EBU Review—Technical, European Broadcasting Union, Brussels, BE, No. 281, Sep. 21, 1999, pp. 14-19, XP000862720, ISSN: 0251-0936.

*Primary Examiner*—Edan Orgad
*Assistant Examiner*—Bobbak Safaipour
(74) *Attorney, Agent, or Firm*—Wenderoth, Lind & Ponack, L.L.P.

(57) ABSTRACT

A mobile terminal is provided for achieving continuous program viewing/listening by appropriately switching between program reception through broadcasting and program reception through communication with a broadcast receiving function and a communication function working cooperatively. A receiver receives a program broadcasted from a broadcasting station. A reception state monitoring section monitors a state of receiving the broadcast program in the receiver. If the reception state is in a satisfactory state, the broadcast program is reproduced by the reproducing section. Upon determination by the reception state monitoring section that the reception state has been deteriorated, a program information generating section generates program information specifying the broadcast program being currently received by the receiver, and then gives the program information to a communication section. The communication section communicates with a program distribution center to receive program data corresponding to the generated program information by streaming. The program data received through communication is reproduced instead of the broadcast program by the reproducing section.

11 Claims, 15 Drawing Sheets

U.S. PATENT DOCUMENTS

| | | |
|---|---|---|
| 6,122,263 A | 9/2000 | Dahlin et al. |
| 7,054,592 B2 * | 5/2006 | Tatsumi et al. ............ 455/3.06 |
| 7,089,007 B2 * | 8/2006 | Wakuta et al. .............. 455/436 |
| 2002/0010763 A1 * | 1/2002 | Salo et al. .................. 709/220 |
| 2002/0045445 A1 * | 4/2002 | Higuchi ..................... 455/425 |
| 2002/0045449 A1 * | 4/2002 | Oobayashi .................. 455/436 |
| 2002/0183059 A1 * | 12/2002 | Noreen et al. .............. 455/427 |
| 2003/0043775 A1 * | 3/2003 | Kikuchi ...................... 370/342 |
| 2004/0102159 A1 * | 5/2004 | Suda et al. ............... 455/67.11 |
| 2004/0203336 A1 * | 10/2004 | Sinnarajah et al. ........ 455/3.01 |
| 2006/0111038 A1 * | 5/2006 | Tatsumi et al. ............ 455/3.01 |
| 2006/0245605 A1 * | 11/2006 | Matsunaga .................. 381/123 |

* cited by examiner

FIG. 4A

| RECEPTION CHANNEL | CURRENT DATE/TIME |
|---|---|
| 1 0 | 2002/10/30 13h30m15s60 |

FIG. 4B

| PROGRAM ID | CURRENT DATE/TIME |
|---|---|
| 1234567 | 2002/10/30 13h30m15s60 |

FIG. 4C

| PROGRAM ID | FRAME NUMBER |
|---|---|
| 1234567 | 150 |

FIG. 4D

| PROGRAM ID | PACKET NUMBER |
|---|---|
| 1234567 | 106 |

MOBILE TERMINAL HAVING FUNCTIONS OF PROGRAM RECEPTION THROUGH BROADCASTING AND THROUGH NETWORK COMMUNICATION, AND PROGRAM RECEPTION CONTROLLING METHOD

BACKGROUND OF INVENTION

1. Field of the Invention

The present invention relates to a mobile terminal having a function of program reception through broadcasting and a function of program reception through communication, and a program reception controlling method. More specifically, the present invention relates to a mobile terminal achieving continuous program viewing/listening by appropriately switching between program reception through broadcasting and program reception through communication with both of the above functions working cooperatively, and a program reception controlling method performed by the mobile terminal.

2. Description of the Related Art

As well known, mobile terminals, such as cellular phones and Personal Digital Assistants (PDAs), having a function of connecting to a network, such as the Internet, for communication (hereinafter referred to as a communication function) have been widely available. Furthermore, in recent years, mobile terminals having a function of receiving broadcast waves, such as television broadcast waves (hereinafter referred to as a broadcast receiving function) have also been developed. Therefore, it can be expected that mobile terminals will be used more often for viewing television broadcasting.

However, the reception state of a mobile terminal may be deteriorated while the user is moving with the mobile terminal to a place, such as an underground mall, where broadcast waves cannot reach the mobile terminal. If the user moves to such a place where the reception state is deteriorated while viewing or listening to a program through broadcasting by using the mobile terminal, it is likely that continuous viewing/listening of the program will become difficult.

In this case, it would be very convenient if the user can receive the program, of which continuous viewing/listening is difficult, through communication by using the communication function of the mobile terminal via a communication route for continuous program viewing/listening.

Therefore, an object of the present invention to provide a mobile terminal achieving continuous program viewing/listening by appropriately switching between program reception through broadcasting and program reception through communication with both of the broadcast receiving function and the communication function of the mobile terminal working cooperatively, and a program reception controlling method performed by the mobile terminal.

BRIEF SUMMARY OF THE INVENTION

The present invention is directed to a mobile terminal which receives a broadcast program and receives program data identical in content to the broadcast program through communication with a program distribution center via a network. In order to attain the above object, the mobile terminal of the present invention includes a receiver, a state determining section, a program information generating section, a communication section, and a reproducing section.

The receiver receives the broadcast program. The state determining section determines whether the mobile terminal has entered a predetermined state. The program information generating section generates program information specifying the broadcast program received by the receiver. The communication section transmits the program information to the program distribution center and receives the program data corresponding to the broadcast program specified by the program information from the program distribution center. Upon a determination by the state determining section that the mobile terminal has entered the predetermined state, the reproducing section switches from reproduction of the broadcast program received by the receiver to reproduction of the program data received by the communication section.

Typically, the state determining section includes a reception state monitoring section for monitoring a state of receiving the broadcast program in the receiver, and the predetermined state is a state in which the state of receiving the broadcast program is deteriorated.

Alternatively, the state determining section includes a reception state monitoring section for monitoring a state of receiving the broadcast program in the receiver, and the predetermined state is a state in which the state of receiving the broadcast program will be deteriorated after a predetermined period of time.

Still alternatively, the state determining section is structured by using a position specifying section for specifying a position to which the mobile terminal will move and a reception state estimating section having information on weak-signal areas for estimating that a position to which the mobile terminal will move after a predetermined period of time will be within a weak-signal area. Here, the predetermined state is a state in which the mobile terminal is in a position where the mobile terminal will move into the weak-signal area after the predetermined period of time.

Here, if the mobile terminal further includes a recording section operable to record the program data received by the communication section, the reproducing section can reproduce the program data recorded in the recorder during a period of time required for switching from the reproduction of the broadcast program to the reproduction of the program data received by the communication section. The period of time required for reproduction switching by the reproducing section preferably includes a period of time for changing an image setting required based on a difference in image resolution between the broadcast program received by the receiver and the program data received by the communication section.

Preferably, the program information further includes information specifying are producing point in the broadcast program at a time when the mobile terminal enters the predetermined state. Alternatively, the program information further includes information specifying a reproducing point desired by a user in the broadcast program.

Upon determination by the state determining section that the mobile terminal has been recovered from the predetermined state, the reproducing section may again switch to reproduction of the broadcast program received by the receiver. Also, upon determination that the mobile terminal has entered the predetermined state, the state determining section may report the determination to a user and, in accordance with a switching instruction given from the user, the reproducing section may continue reproduction by switching from the broadcast program received by the receiver to the program data received by the communication section.

The processes performed by the components of the above-described mobile terminal can be taken as forming a program reception controlling method. That is, the program reception controlling method is carried out by a mobile terminal which receives a broadcast program and receives program data identical in content to the broadcast program through communication with a program distribution center via a network. In the program reception controlling method, a broadcast program is received; whether the mobile terminal has entered a predetermined state is determined; program information specifying the received broadcast program is generated; the generated program information is transmitted to the program distribution center and the program data corresponding to the broadcast program specified by the program information is received from the program distribution center; and, upon determination that the mobile terminal has entered the predetermined state, switching is performed from reproduction of the broadcast program received through broadcasting to reproduction of the program data received through communication.

Preferably, this program reception controlling method is provided in a form of a computer program for causing a mobile terminal to execute the series of processes. This program may be recorded on a computer-readable recording medium.

As has been described above, according to the present invention, a communication function and a broadcast receiving function are provided. For viewing and/or listening to a specific program, switching is performed such that a program supplied through broadcasting is reproduced when program reception through broadcasting is possible, while the program data supplied through communication is reproduced when program reception through broadcasting becomes difficult. With this, even if program reception through broadcasting becomes difficult, program viewing/listening can be continued. Also, switching is determined in consideration of a process for switching from program reception through broadcasting to program reception through communication. Therefore, it is also possible to avoid a phenomenon in which deteriorated images and/or sounds are provided to the user at the time of switching.

Also, with the program information including information specifying a reproducing point in the broadcast program at a time when the reception state in the receiver is deteriorated, the user does not have to view and/or listen to the portions of the program that have been viewed and/or listened to already. Furthermore, with the program information including information specifying a reproducing point desired by the user in the broadcast program, the user can continue program viewing from a desired point. Still further, once the state is recovered to allow program reception through broadcasting, switching is performed from reproduction of the program data received through communication to reproduction of the broadcast program. Therefore, continuous program viewing/listening can be achieved at the lowest communication cost. Still further, since switching can be performed as an explicit user's operation, it is possible to prevent frequent occurrence of switching when the state of receiving a broadcast wave fluctuates around a boundary differentiating between a satisfactory state and a deteriorated state.

DETAILED DESCRIPTION OF THE DRAWINGS

FIGS. 4A through 4D are illustrations showing examples of program information generated by a program information generating section illustrated in FIG. 2.

DETAILED DESCRIPTION OF THE INVENTION

Figure 1:
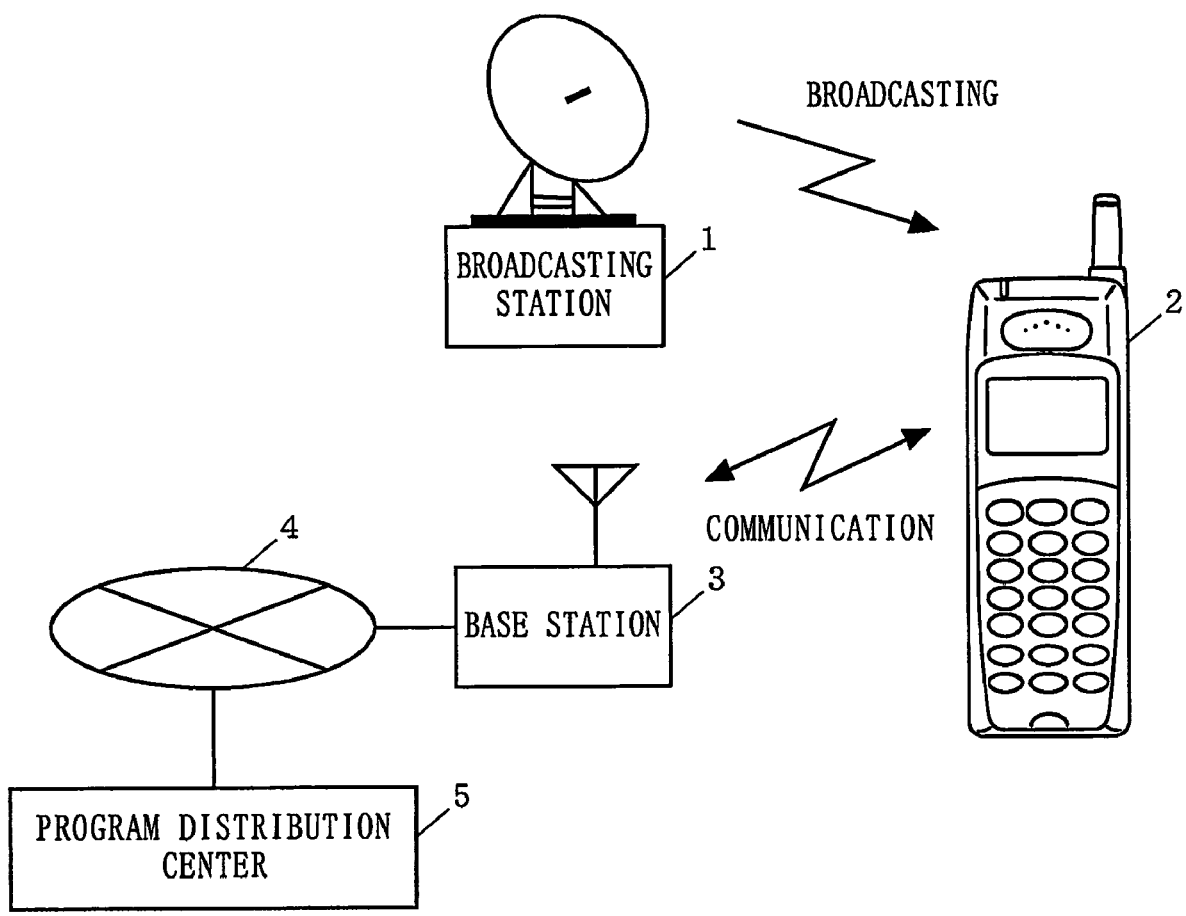
FIG. 1 is an illustration schematically illustrating a program viewing/listening system using a mobile terminal according to each embodiment of the present invention.

FIG. 1 is an illustration schematically illustrating a program viewing/listening system using a mobile terminal according to each embodiment of the present invention. In FIG. 1, the program viewing/listening system of the present invention includes a broadcasting station 1, a mobile terminal 2, a base station 3, and a program distribution center 5. The base station 3 and the program distribution center 5 are connected to each other via a network 4. Note that FIG. 1 exemplarily illustrates a case where the mobile terminal 2 is a cellular phone.

The broadcasting station 1 broadcasts programs (television programs, radio programs, etc.) providing video, music, or the like. The program distribution center 5 stores program data that can provide contents identical to those of the programs broadcasted from the broadcasting station 1. The program distribution center 5 may store in advance a plurality of pieces of program data corresponding to all broadcast programs, or may retrieve from the broadcasting station 1 only the necessary program data when required via a network (not shown) connecting the broadcasting station 1 and the program distribution center 5 together. This program distribution center 5 distributes program data upon request to the mobile terminal 2 via the base station 3 through communication targeted for only the mobile terminal 2 requesting data distribution. The mobile terminal 2 has a broadcast receiving function for receiving programs broadcasted from the broadcasting station 1 and a communication function for receiving program data distributed from the program distribution center 5. The mobile terminal can switch between a broadcast program received through broadcasting or program data received through communication for reproduction.

With reference to the drawings, a program reception controlling method performed by the mobile terminal 2 according to each embodiment of the present invention is described in detail below.

FIRST EMBODIMENT

Figure 2:
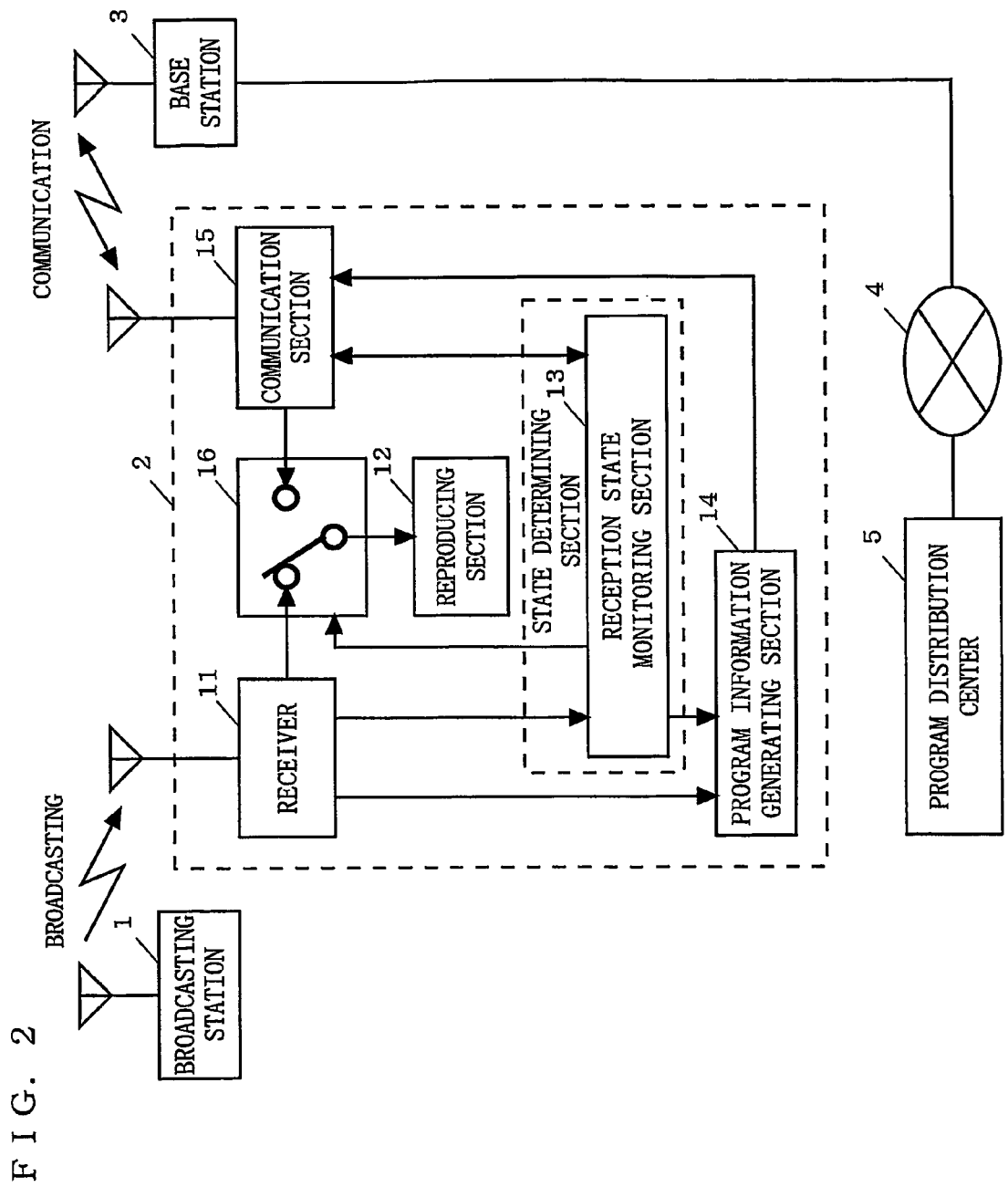
FIG. 2 is a block diagram illustrating a detailed structure of a mobile terminal according to a first embodiment of the present invention.
Figure 3:
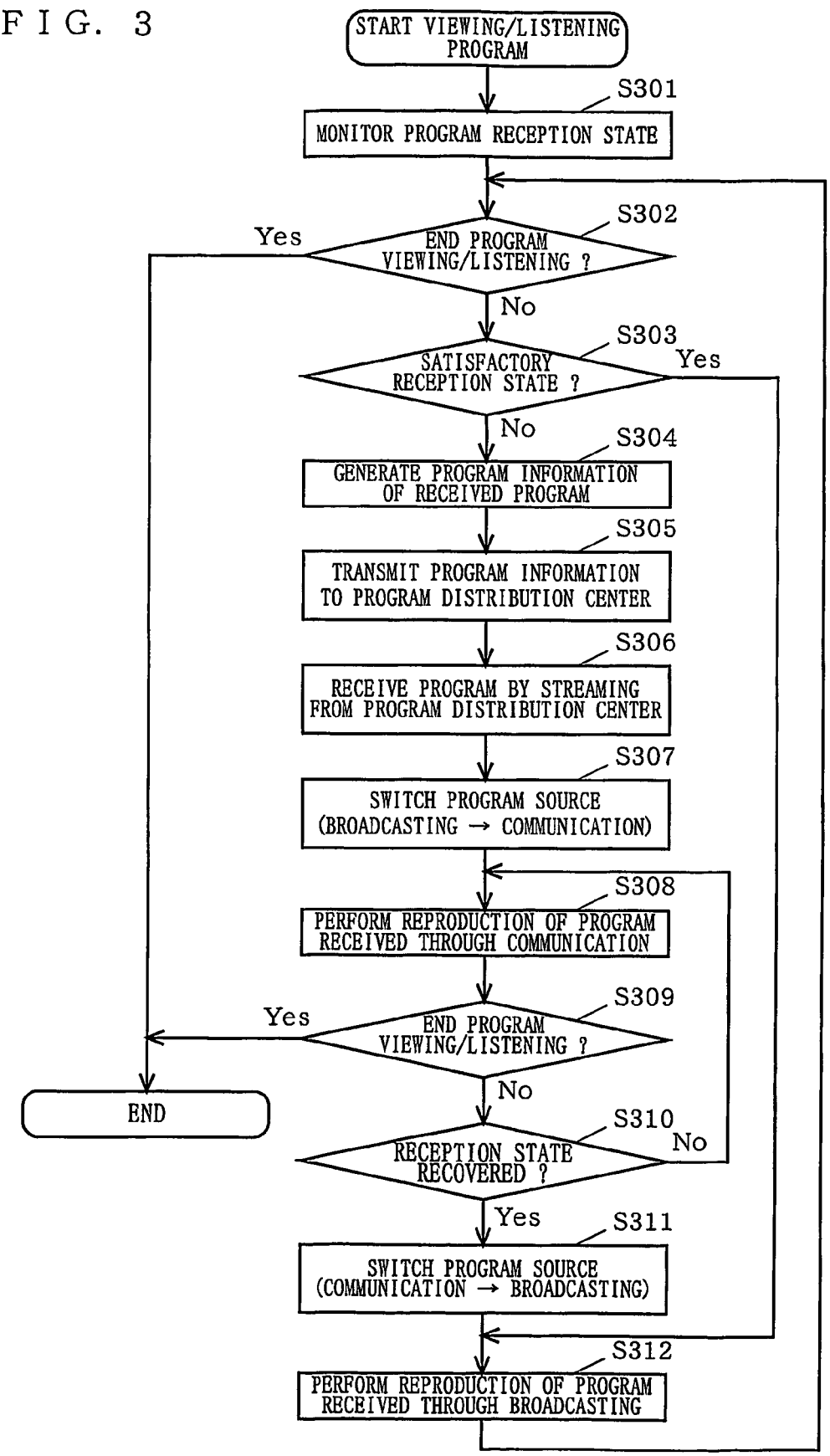
FIG. 3 is a flowchart showing a procedure of a program reception controlling method performed by the mobile terminal according to the first embodiment of the present invention.
Figure 5:
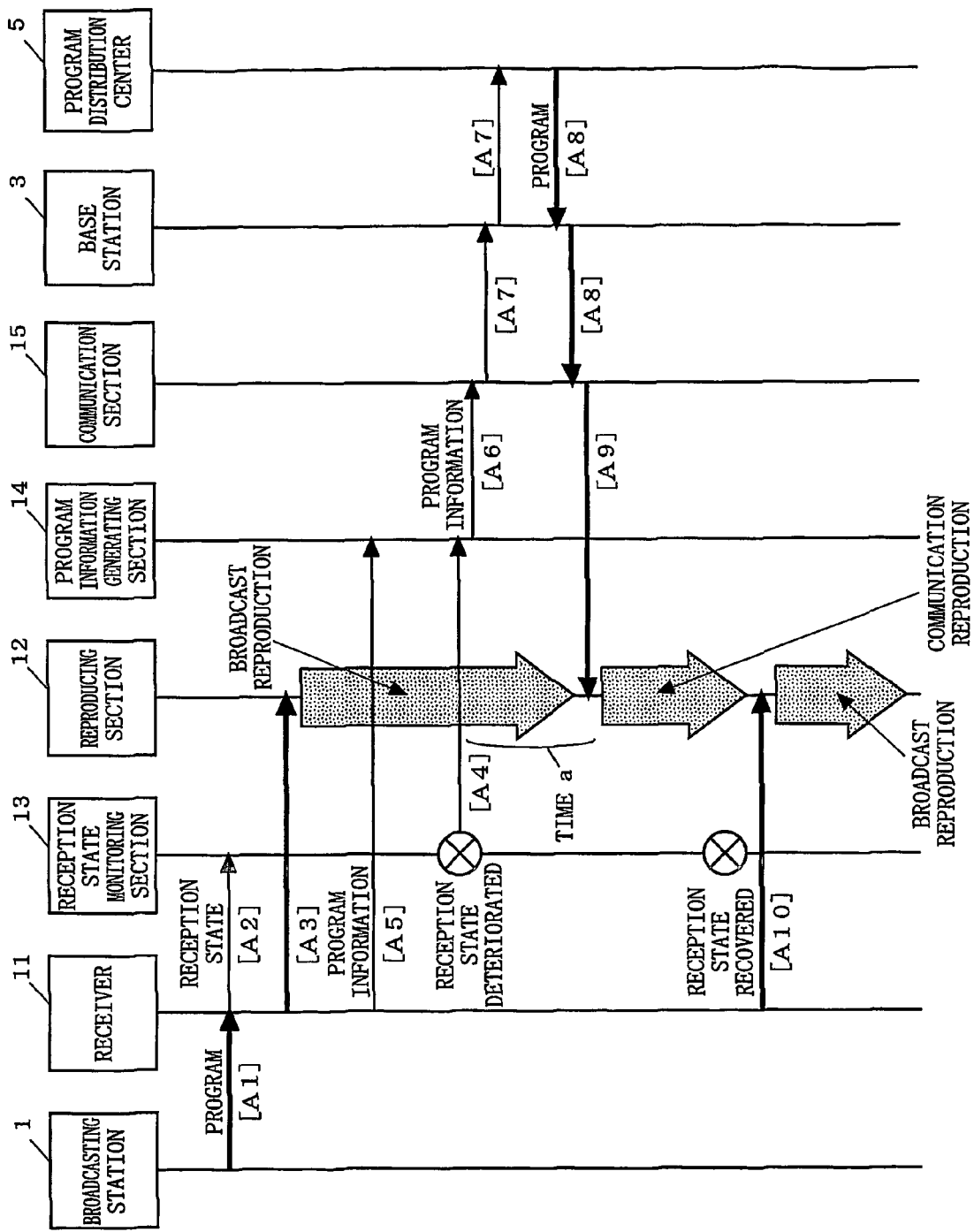
FIG. 5 is an illustration showing one example of a communication sequence of a process performed according to the flowchart of FIG. 3.

FIG. 2 is a block diagram illustrating a detailed structure of a mobile terminal 2 according to a first embodiment of the present invention. FIG. 3 is a flowchart showing a procedure of a program reception controlling method performed by the mobile terminal 2 according to the first embodiment of the present invention. FIGS. 4A through 4D are illustrations showing examples of program information generated by a program information generating section 14, as illustrated in FIG. 2. FIG. 5 is an illustration showing one example of a communication sequence of a process performed according to the flowchart of FIG. 3.

First, with reference to FIG. 2, the detailed structure and general outline of the mobile terminal 2 according to the first embodiment of the present invention are described. In FIG. 2, the mobile terminal 2 includes a receiver 11, a reproducing section 12, a state determining section including a reception state monitoring section 13, a program information generating section 14, a communication section 15, and a switching section 16.

The receiver 11 receives a program broadcasted from the broadcasting station 1. The reception state monitoring section 13, which is a component for determining the state of the mobile terminal, monitors a state of receiving the broadcast program in the receiver 11. The program information generating section 14 generates predetermined program information specifying the broadcast program received by the receiver 11. The communication section 15 performs data communication with the base station 3 for receiving program data. When the mobile terminal 2 is a cellular phone, a voice call function can also be achieved by this communication section 15. The switching section 16 selects either one of the broadcast program received by the receiver 11 or the program data received by the communication section 15 for output. The reproducing section 12 reproduces the broadcast program or the program data output from the switching section 16.

With reference to FIGS. 3 through 5, the program reception controlling method performed by the mobile terminal 2 according to the first embodiment is described below. The mobile terminal 2 of the present invention performs a process described below when the state of receiving broadcast waves is deteriorated while program viewing/listening is performed through broadcasting.

When the user issues an instruction for program viewing to cause the receiver 11 to start receiving a program through broadcasting [A1], the reception state monitoring section 13 starts monitoring the state of receiving the broadcast program being received by the receiver 11 [A2] (step S301). The reception state monitoring section 13 then determines whether the state of receiving the broadcast program in the receiver 11 has entered a predetermined state (step S303). Here, the predetermined state indicates a deteriorated state to which that the reception state has changed from being in a satisfactory state, that is, the reception state has been deteriorated. Deterioration in reception state means that program viewing/listening through broadcasting is difficult. Typical examples of such a case is that no broadcast wave can reach the mobile terminal or that the intensity of the receive wave is attenuated to a predetermined level. In such a case, the reception state monitoring section 13 specifically carries out, for example, a scheme of determining whether the reception state has entered the predetermined state based on whether the intensity of the receive wave has reached at a predetermined wave intensity level (a threshold level th) at which it is determined that the reception state has deteriorated.

If it is determined by the reception state monitoring section 13 that the reception state has not entered the predetermined state, that is, the reception state is in a satisfactory state (step S303, Yes), the broadcast program received by the receiver 11 is output via the switching section 16 to the reproducing section 12. The reproducing section 12 then reproduces the broadcast program supplied via the switching section 16 [A3] (step S312). On the other hand, if it is determined that the reception state has entered the predetermined state, that is, the reception state has been deteriorated (step S303, No), the reception state monitoring section 13 reports to the program information generating section 14 that the reception state has been deteriorated [A4].

Upon receipt of the report from the reception state monitoring section 13 indicating that the reception state has been deteriorated, the program information generating section 14 generates predetermined program information regarding the program currently being received by the receiver 11 [A5] (step S304). This program information includes at least information specifying the program currently being received and a current viewing/listening point in the program (that is, a reproducing point in the program when the reception state becomes deteriorated). A suitable example of the program information includes a reception channel and current date/time (FIG. 4A). If each program is given in advance a unique identification number (program ID), the reception channel can be replaced by the program ID (FIG. 4B). If broadcasting is digital, the current data/time can be replaced by a frame number or a packet number (FIG. 4C or 4D). Then, the program information generating section 14 gives the generated program information to the communication section 15 [A6].

The communication section 15 transmits the program information received from the program information generating section 14 to the program distribution center 5 via the base station 3 and the network 4 [A7] (step S305).

Upon receipt of the program information from the communication section 15, the program distribution center 5 distributes, by streaming, program data corresponding to the broadcast program specified by the program information, that is, the broadcast program being received through broadcasting when the reception state becomes deteriorated [A8]. At this time, the program distribution center 5 distributes the program data by streaming from the viewing/listening point specified by the program information. Here, in consideration of a period of time a (minutes) required for a series of processes from a process of determining by the reception state monitoring section 13 whether the reception state has been deteriorated to a process of receiving the program data by the communication section 15, program streaming distribution may be performed with the viewing/listening point being shifted by the period of time a.

The communication section 15 sequentially receives the program data distributed by the program distribution center 5 by streaming, and then reports the start of reception to the reception state monitoring section 13 (step S306). Upon reception of the report from the communication section 15, in order to cause the communication section 15 to output the program data received by streaming to the reproducing section 12, the reception state monitoring section 13 controls switching of the switching section 16 (switching from broadcasting to communication) (step S307). Then, the reproducing section 12 reproduces the program data received through communication via the switching section 16 [A9] (step S308).

If it is determined that the reception state has been recovered and is back to in a satisfactory state after switching to reproduction of the program data received through communication (step S310, Yes), in order to cause the broadcast program received by the receiver 11 to be output again to the reproducing section 12, the reception state monitoring section 13 controls switching of the switching section 16 (switching from communication to broadcasting) (step S311). Also, the reception state monitoring section 13 instructs the communication section 15 to end streaming reception of the program data distributed by the program distribution center 5. The reproducing section 12 then reproduces the broadcast program supplied via the switching section 16 [A10] (step S312).

Note that the above-described program receiving control process ends when the user gives an instruction of ending program viewing/listening (steps S302 and S309).

As described above, according to the mobile terminal and the program reception controlling method of the first embodiment of the present invention, a communication function and a broadcast receiving function are provided. For viewing and/or listening to a specific program, switching is performed such that a program supplied through broadcasting is reproduced when program reception through broadcasting is possible in a satisfactory state, while the program data supplied through communication is reproduced when program reception through broadcasting becomes difficult. With this, even if program reception through broadcasting becomes difficult, program viewing/listening can be continued. Also, once the state is recovered to allow program reception through broadcasting, switching is performed from reproduction of the program data received through communication to reproduction of the broadcast program. Therefore, continuous program viewing can be achieved at the lowest communication cost. If communication cost is not taken into consideration, even though the state is recovered to allow program reception through broadcasting, reproduction of the program data received through communication can continue.

Also, it is assumed in the above first embodiment that switching is automatically performed between reproduction of the program received through broadcasting and reproduction of the program received through communication. Alternatively, when the reception state monitoring section determines that the reception state has been deteriorated or that the reception state has been recovered to be in a satisfactory state, the user may be informed of such through screen display or the like to be prompted to manually determine whether to switch a program source. As such, if determination as to switching can be made manually, it is possible to prevent frequent occurrence of switching when the state of receiving a broadcast wave fluctuates around a boundary (the threshold level) differentiating between a satisfactory state and a deteriorated state.

Furthermore, in the above first embodiment, an object is to smoothly switch between reproduction of the program received through broadcasting and reproduction of the program received through communication without image dropout or redundancy. Alternatively, if the above-described determination is made manually by the user, it is possible to start reproducing the program data received through communication from a point preceding the current viewing/listening point (for example, from the very beginning of the program) or from a point subsequent to the current viewing/listening point (for example, from a point at the end of a commercial message). In this case, the program information generated by the program information generating section includes an instruction corresponding to a desired reproduction type. For example, if it is desired to view and/or listen to the received program from a viewing point different from the current viewing point, information designating a viewing start point (for example, "ten minutes before" or "immediately after the end of a commercial message") is further included in the program information. If it is desired to view and/or listen to the program from the very beginning, only the information specifying the received program is enough for the program information.

SECOND EMBODIMENT

In the above first embodiment, descriptions have been made to the technique in which a process of reproducing program data received through communication is started after the state of receiving a broadcast wave has been deteriorated. However, if a process of switching to reception through communication is started only after the reception state of the broadcast wave is deteriorated, deteriorated broadcast images and/or sounds are provided to the user until the time when the program data received through communication is reproduced. To get around this problem, a mobile terminal and a program reception controlling method according to a second embodiment are provided as described below, wherein deteriorated images and/or sounds are prevented from being provided to the user.

Figure 6:
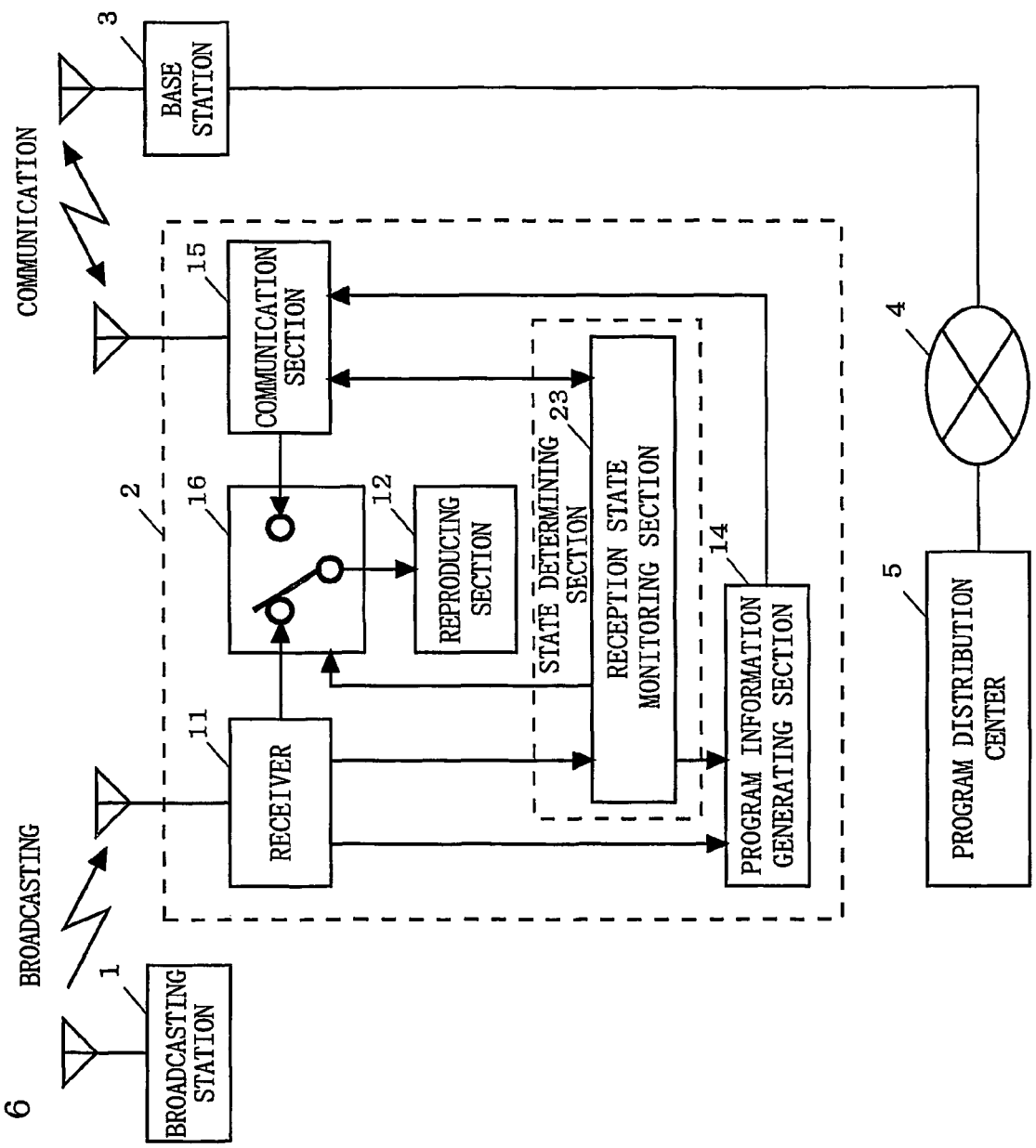
FIG. 6 is a block diagram illustrating a detailed structure of a mobile terminal according to a second embodiment of the present invention.
Figure 7:
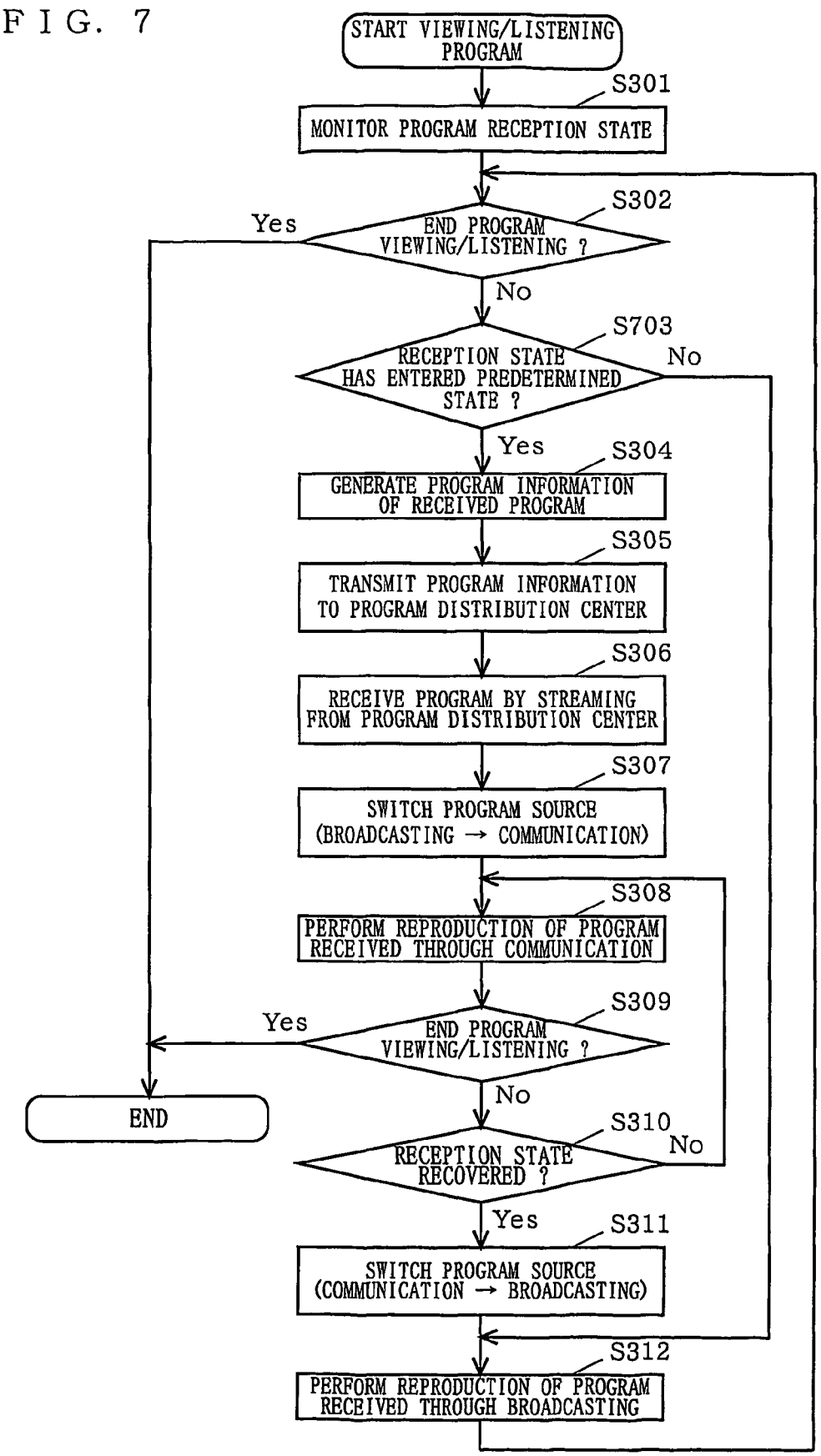
FIG. 7 is a flowchart showing a procedure of a program reception controlling method performed by the mobile terminal according to the second embodiment of the present invention.
Figure 8:
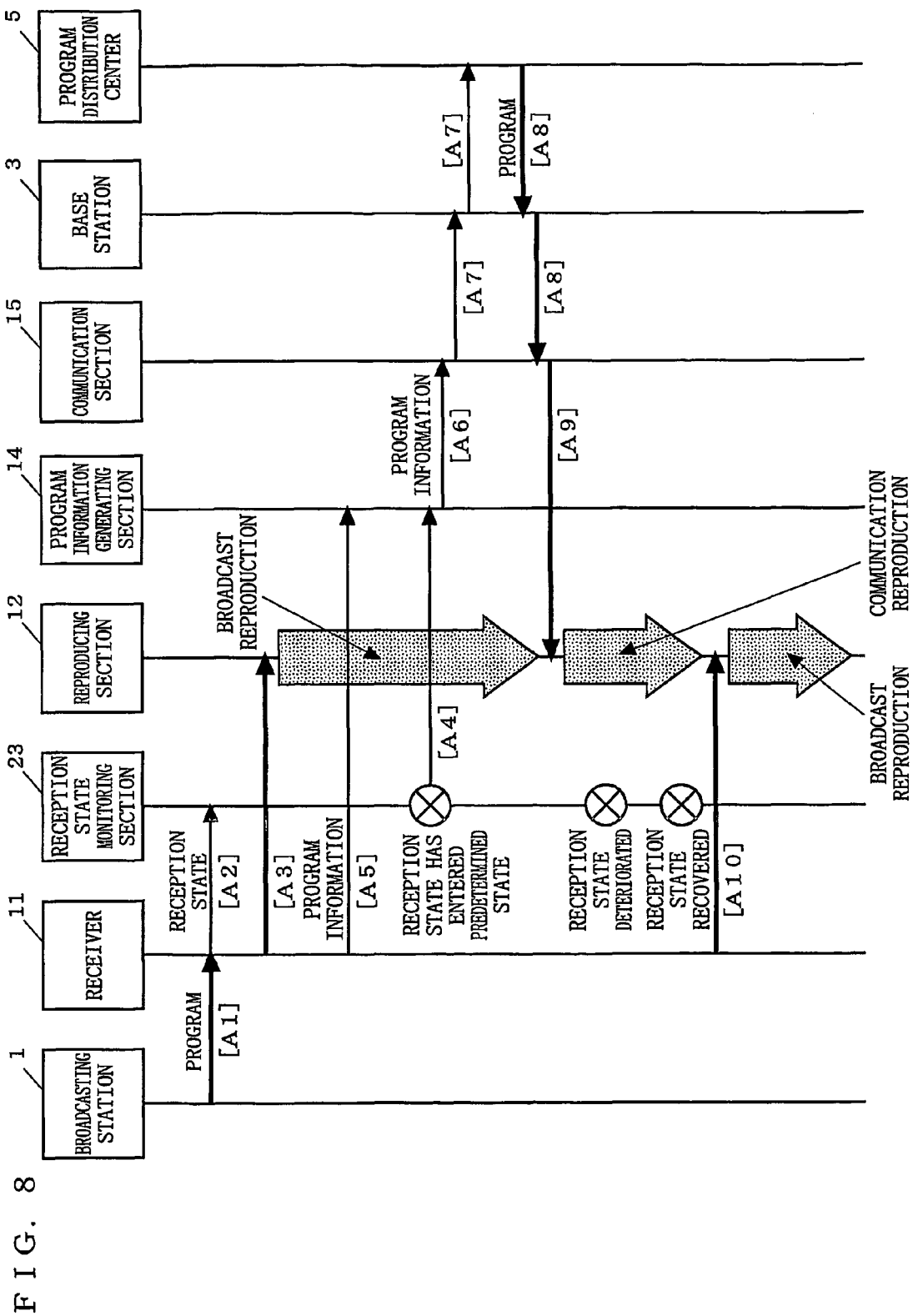
FIG. 8 is an illustration showing one example of a communication sequence of a process performed according to the flowchart of FIG. 7.

FIG. 6 is a block diagram illustrating a detailed structure of a mobile terminal 2 according to the second embodiment of the present invention. FIG. 7 is a flowchart showing a procedure of the program reception controlling method performed by the mobile terminal 2 according to the second embodiment of the present invention. FIG. 8 is an illustration showing one example of a communication sequence of a process performed according to the flowchart of FIG. 7.

In FIG. 6, the mobile terminal 2 includes a receiver 11, a reproducing section 12, a state determining section including a reception state monitoring section 23, a program information generating section 14, a communication section 15, and a switching section 16. As can been seen from FIG. 6, the mobile terminal 2 according to the second embodiment is different from the mobile terminal 2 according to the above-described first embodiment in that the state determining section includes the reception state monitoring section 23. Hereinafter, description is made to the mobile terminal 2 of the second embodiment, mainly with regard to this different component.

The program reception controlling method performed by the mobile terminal 2 according to the second embodiment is described below.

When the user issues an instruction for program viewing/listening to cause the receiver 11 to start receiving a program through broadcasting [A1], the reception state monitoring section 23 starts monitoring the state of receiving the program being received by the receiver 11 [A2] (step S301). The reception state monitoring section 23 then determines whether the state of receiving the broadcast program in the receiver 11 has entered a predetermined state (step S703). Here, the predetermined state indicates that the reception state is now in a satisfactory state but will be deteriorated (the intensity of a receive wave will be attenuated) soon (after a predetermined period of time) Specifically, the reception state monitoring section 23 carries out a scheme of determining in advance a threshold level th' higher than the above-described threshold level th in the first embodiment and then determining whether the reception state has entered the predetermined state based on whether the intensity of the receive wave has reached this threshold level th'.

Here, the threshold level th' is set so that a predetermined process for switching from data reception through broadcasting to data reception through communication will have been completed by the time when the reception state passes the threshold level th. For example, a period of time a required for this predetermined process is found and, in accordance with a predetermined amount of change, an attenuation amount A by which the wave intensity is attenuated during that the period of time a is then found. Then, the threshold level th' is set as th'=th+A. If, however, whether the reception state has entered the predetermined state is determined only based on whether the intensity of the receive wave has reached the threshold level th', it is likely to frequently change the determination in the vicinity of the threshold level th'. To get around this problem, it is preferable, for example, that an amount of change in the intensity of the reception wave per unit time (the gradient of attenuation) is measured and, only when the amount of change is larger than the above-mentioned predetermined amount of change and the intensity of the receive wave has reached the threshold level th' is it determined that the reception state has entered the predetermined state.

While it is determined by the reception state monitoring section 23 that the reception state has not entered the predetermined state (step S703, No), the broadcast program received by the receiver 11 is output via the switching section 16 to the reproducing section 12. The reproducing section 12 reproduces the broadcast program supplied via the switching section 16 [A3] (step S312).

On the other hand, when it is determined that the reception state has entered the predetermined state (step S703, Yes), the reception state monitoring section 23 reports to the program information generating section 14 that the reception state has entered the predetermined state [A4]. Upon reception of the report from the reception state monitoring section 13, the program information generating section 14 generates predetermined program information regarding the program currently being received by the receiver 11 [A5] (step S304). The communication section 15 then transmits the predetermined program information received from the program information generating section 14 to the program distribution center 5 (step S305), then sequentially receives program data corresponding to the relevant program by streaming from the program distribution center 5 and also reports the start of reception to the reception state monitoring section 23 (step S306).

Upon reception of the report from the communication section 15, in order to cause the program data received by streaming by the communication section 15 to be output to the reproducing section 12, the reception state monitoring section 23 controls switching of the switching section 16 (switching from broadcasting to communication) (step S307). The reproducing section 12 then reproduces the program data received through communication via the switching section 16 (step S308).

As described above, according to the mobile terminal and program reception controlling method of the second embodiment of the present invention, in addition to the effect of the above first embodiment which allows continuous program viewing/listening even if program reception through broadcasting becomes difficult, it is also possible to avoid a phenomenon in which deteriorated images and/or sounds are provided to the user at the time of switching.

THIRD EMBODIMENT

Figure 9:
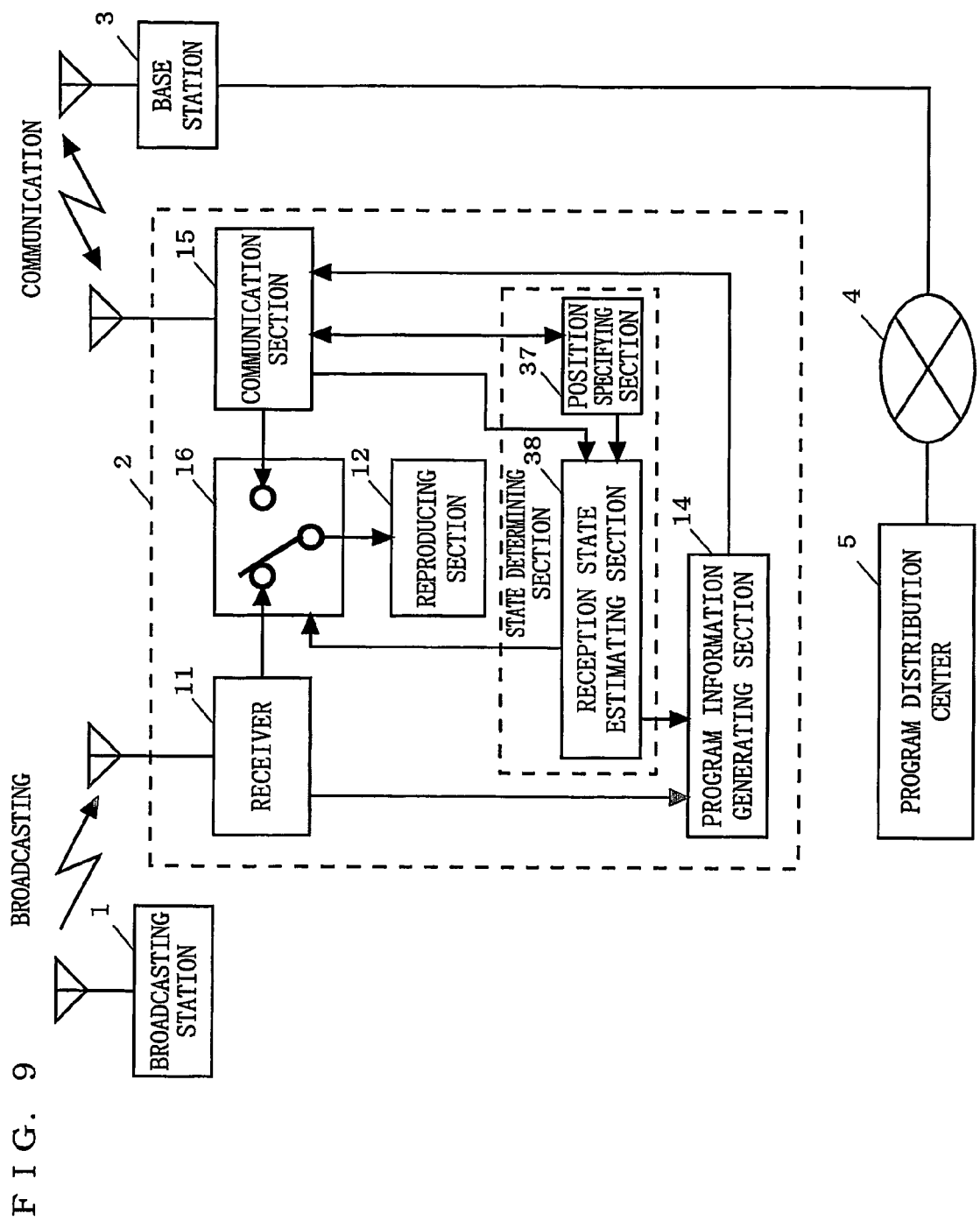
FIG. 9 is a block diagram illustrating a detailed structure of a mobile terminal according to a third embodiment of the present invention.
Figure 10:
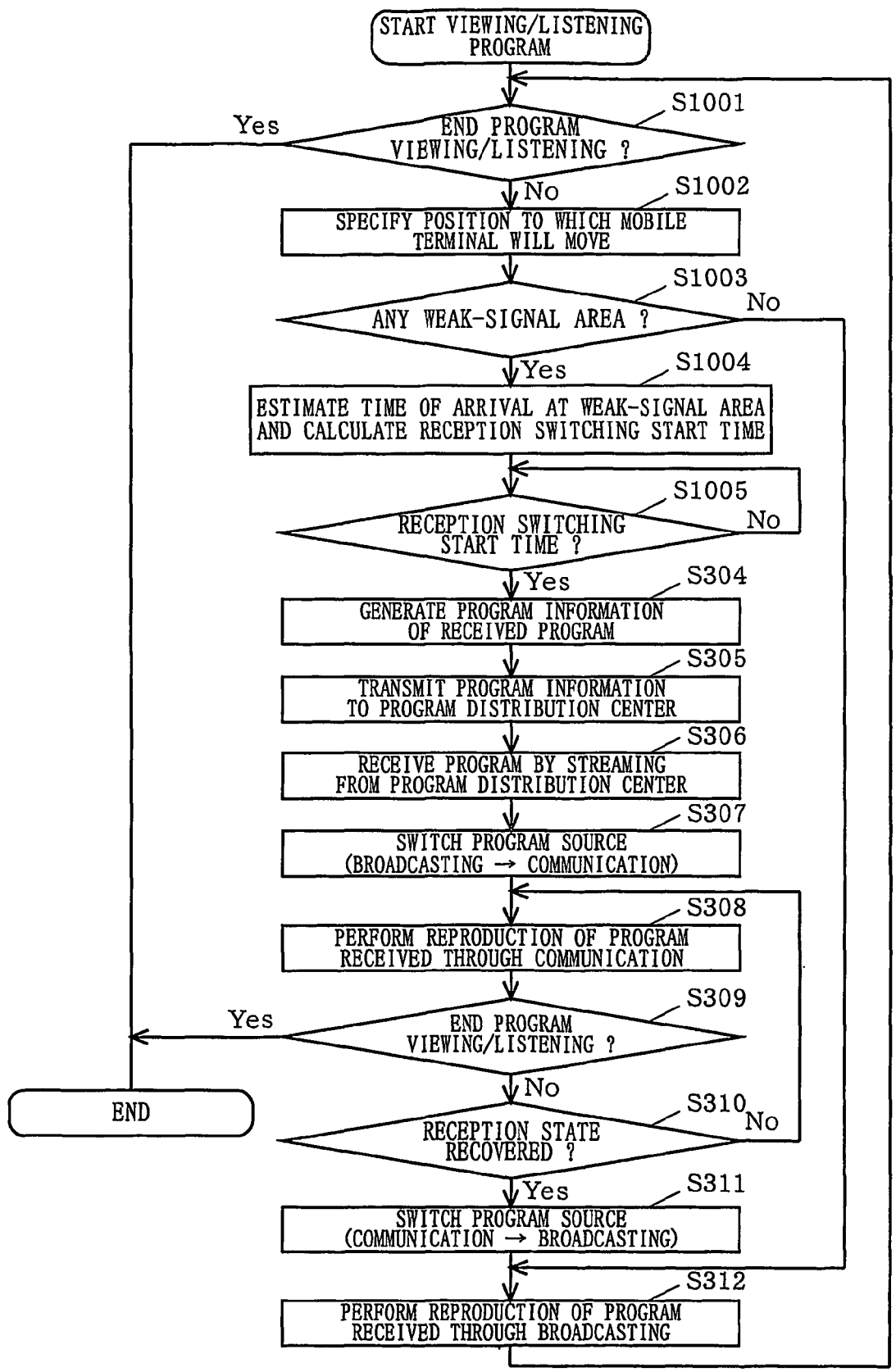
FIG. 10 is a flowchart showing a procedure of a program reception controlling method performed by the mobile terminal according to the third embodiment of the present invention.
Figure 11:
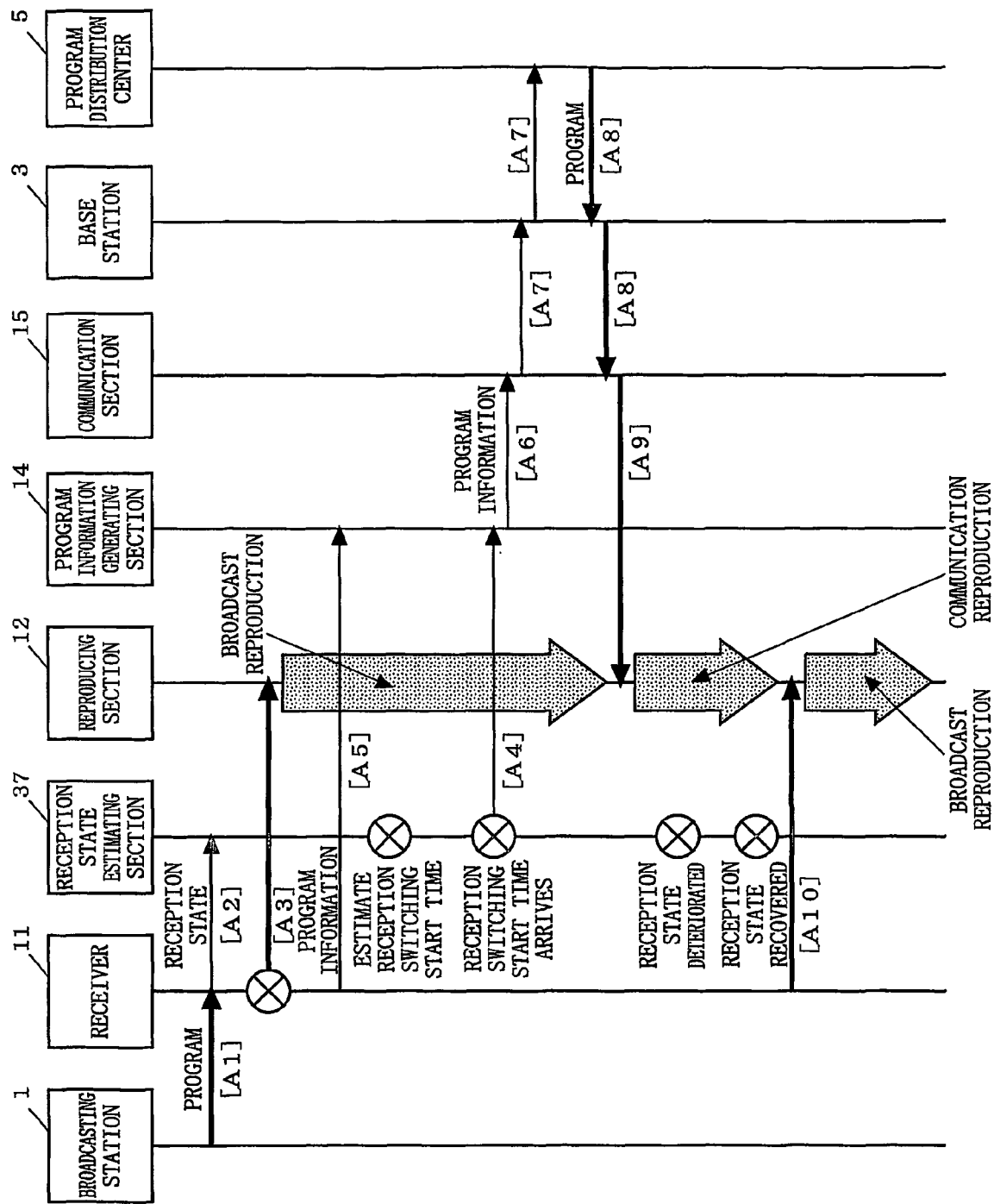
FIG. 11 is an illustration showing one example of a communication sequence of a process performed according to the flowchart of FIG. 10.

FIG. 9 is a block diagram illustrating a detailed structure of a mobile terminal 2 according to a third embodiment of the present invention. FIG. 10 is a flowchart showing a procedure of a program reception controlling method performed by the mobile terminal 2 according to the third embodiment of the present invention. FIG. 11 is an illustration showing one example of a communication sequence of a process performed according to the flowchart of FIG. 10.

In FIG. 9, the mobile terminal 2 includes a receiver 11, a reproducing section 12, a state determining section including a position specifying section 37 and a reception state estimating section 38, a program information generating section 14, a communication section 15, and a switching section 16. As can be seen from FIG. 9, the mobile terminal 2 according to the third embodiment is different from the mobile terminal 2 according to the above first embodiment in that the state determining section includes the position specifying section 37 and a reception state estimating section 38. Hereinafter, description is made to the mobile terminal 2 of the third embodiment, mainly with regard to this different component.

First, general outlines of the position specifying section 37 and the reception state estimating section 38 are described.

The position specifying section 37 obtains the current position, traveling speed, and traveling direction of the mobile terminal 2 to specify a position to which the mobile terminal 2, which changes its position over time, will move. This specifying process is performed by using, for example, a gyroscopic function. The position specifying section 37 is implemented by using, for example, a GPS scheme which allows longitude and latitude on the earth to be determined through a satellite, or a scheme which allows a position in a service area to be determined by using a radio base station. In the case of the position specifying section 37 implemented by using the GPS scheme, time information is received from a plurality of satellites, and based on a difference among the received plurality of pieces of time information, a position of the mobile terminal 2 is specified.

The reception state estimating section 38 has information regarding areas in which the reception state is in a deteriorated state, in other words, weak-signal areas. This information on the weak-signal areas is generated based on information regarding areas where broadcast waves are hard to reach (for example, inside a tunnel, or places obstructed by mountains or tall buildings), which is obtained from three-dimensional land information (3D information), position information of a transmitting station for transmitting broadcast waves, information on areas covered by the transmitting station, etc. The generated information on weak-signal areas is stored as being overlaid on general cartographic information.

The program reception controlling method performed by the mobile terminal 2 according to the third embodiment is described below.

When the user issues an instruction for program viewing/listening to cause the receiver 11 to start receiving a program through broadcasting [A1], the position specifying section 37 specifies a position to which the mobile terminal 2 will move (step S1002). The reception state estimating section 38 then determines, from the position specified by the position specifying section 37 and the information on the weak-signal areas, whether the mobile terminal 2 will enter a weak-signal area after a predetermined period of time (step S1003). That is, it is determined whether the mobile terminal 2 has entered a predetermined state in which the mobile terminal 2 will possibly enter a weak-signal area if it keeps going at the current traveling speed in the current traveling direction for the above predetermined period of time.

If it is determined by the reception state estimating section 38 that the mobile terminal 2 has not entered the predetermined state, that is, the position after the predetermined period of time is not within a weak-signal area (step S1003, No), the broadcast program received by the receiver 11 is output via the switching section 16 to the reproducing section 12. The reproducing section 12 then reproduces the broadcast program supplied via the switching section 16 [A3] (step S312).

On the other hand, if it is determined that the mobile terminal 2 has entered the predetermined state, that is, the position after the predetermined period of time is within a weak-signal area (step S1003, Yes), the reception state estimating section 38 estimates a time when the state of receiving the broadcast program at the receiver will be deteriorated, that is, an arrival time when the mobile terminal 2 arrives at the weak-signal area. This estimation is made on the basis of the current position and traveling speed obtained by the position specifying section 37 and a distance from the current position to the weak-signal area. The reception state estimating section 38 then calculates a time back from the estimated time at least by a period of time required for a predetermined process for switching to data reception through communication (step S1004). The time obtained through calculation (herein after referred to as a reception switching start time) is a time to start performing the process for switching to data reception through communication.

Until the reception switching process is completed, the reception state estimating section 38 controls the switching section 16 so that the broadcast program received by the receiver 11 is output to the reproducing section 12. Then, when the reception switching start time arrives, the reception state estimating section 38 reports such to the program information generating section 14 [A4] (step S1005, Yes). Upon reception of the report from the reception state estimating section 38, the program information generating section 14 generates predetermined program information regarding the broadcast program currently being received by the receiver 11 [A5] (step S304). The communication section 15 transmits the predetermined program information received from the program information generating section 14 to the program distribution center 5 (step S305) to sequentially receive program data corresponding to the relevant program by streaming from the program distribution center 5, and reports the start of reception to the reception state estimating section 38 (step S306).

Upon reception of the report from the communication section 15, in order to cause the program data received by streaming by the communication section 15 to be output to the reproducing section 12, the reception state estimating section 38 controls switching of the switching section 16 (switching from broadcasting to communication) (step S307). The reproducing section 12 then reproduces the program data received through communication via the switching section 16 [A9] (step S308).

As described above, according to the mobile terminal and program reception controlling method of the third embodiment of the present invention, in addition to the effect of the above first embodiment which allows continuous program viewing/listening even if program reception through broadcasting becomes difficult, it is also possible to further avoid a phenomenon in which deteriorated images and/or sounds are provided to the user at the time of switching.

Furthermore, the mobile terminal according to the third embodiment of the present invention can further have incorporated therein the reception state monitoring section 23 according to the second embodiment. In this case, based on either of two incidents which occurred earlier, one in which the intensity of the receive wave was attenuated to the predetermined threshold level and the other in which the reception switching start time arrived, the process for switching to data reception through communication is started.

Still further, if it is estimated that the mobile terminal will travel from the current area where the reception state is in a satisfactory state to a weak-signal area and then soon return to the satisfactory-state area, reception can be switched to the one through communication only when the mobile terminal is within the weak-signal area for a period of time longer than a predetermined period of time. With this, a reception switching process is not frequently performed, thereby reducing process loads on the mobile terminal. The same goes for a case where the mobile terminal will travel from the current weak-signal area to an area where the reception state is in a satisfactory state, and then will soon return to the weak-signal area.

FOURTH EMBODIMENT

In the above second and third embodiments, descriptions have been made to the case where the program data distributed from the program distribution center 5 is sequentially received by streaming for reproduction. However, when the broadcasting station for sending broadcasts and the program distribution center for sending broadcast program each encode a piece of data of different size (different number of pixels) for transmission, it is required to perform a process of matching these pieces of data received by the mobile terminal with each other in size (the number of pixels). Also, a synchronization shift occurs between a program stream received through broadcasting and a program stream received through communication. Therefore, a predetermined period of time (refer to the period of time a in FIG. 5) is required for a process to be performed after switching from broadcasting to communication until data reproduction. Such a process typically includes matching the data size, adjusting a synchronization shift, and decoding the received data. In order to avoid the occurrence of blank display or display of deteriorated images and/or sounds during the above predetermined period of time, for example, the program stream received through communication is recorded and, upon switching to data reception through communication, the recorded program is reproduced a little back from the current viewing/listening point (time-shift playback). In a fourth embodiment, description is made to a mobile terminal and a program reception controlling method which allow time-shift playback by recording program data distributed from the program distribution center 5.

Figure 12:
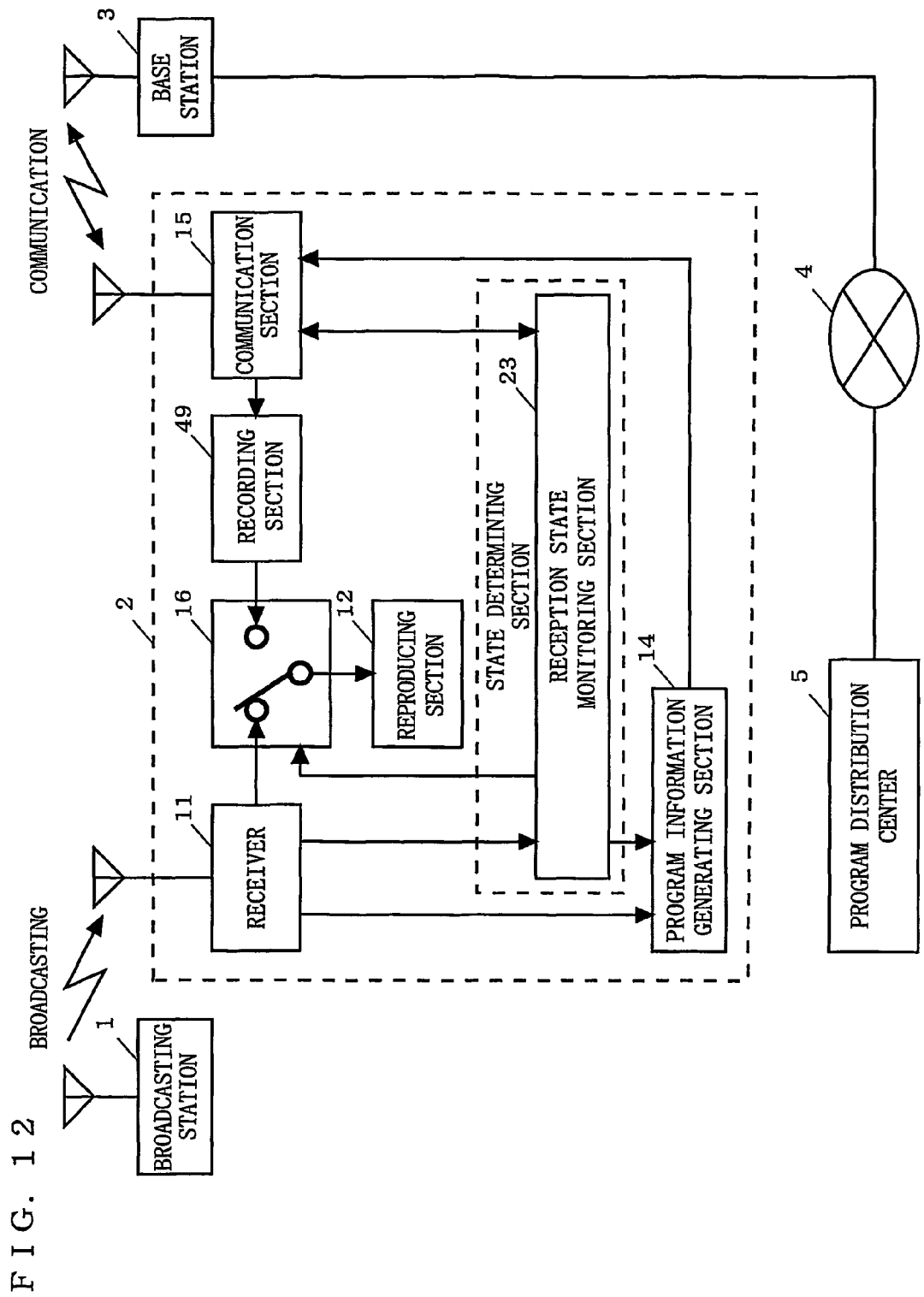
FIG. 12 is a block diagram illustrating a detailed structure of a mobile terminal according to a fourth embodiment of the present invention.
Figure 13:
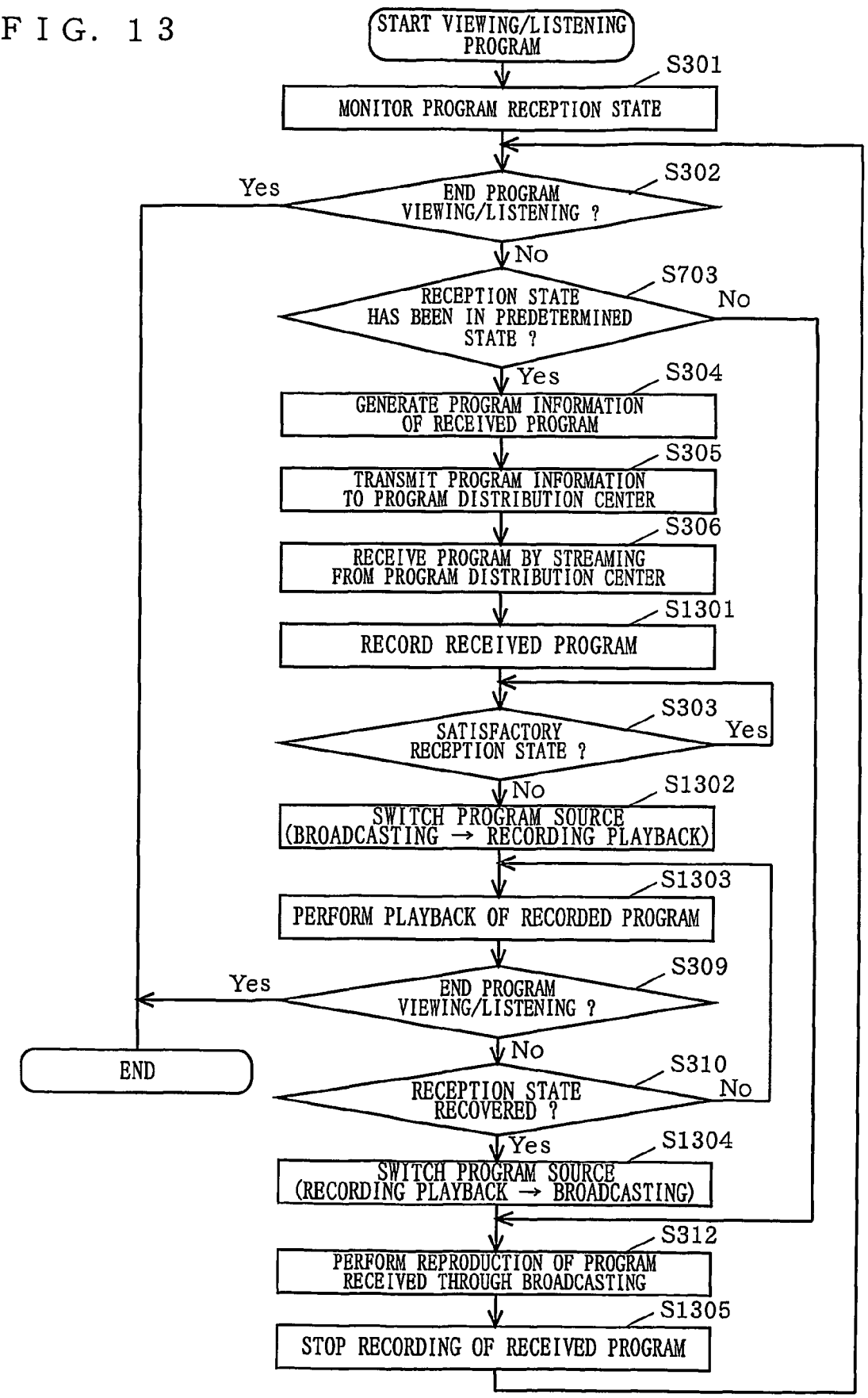
FIG. 13 is a flowchart showing a procedure of a program reception controlling method performed by the mobile terminal according to the fourth embodiment of the present invention.
Figure 14:
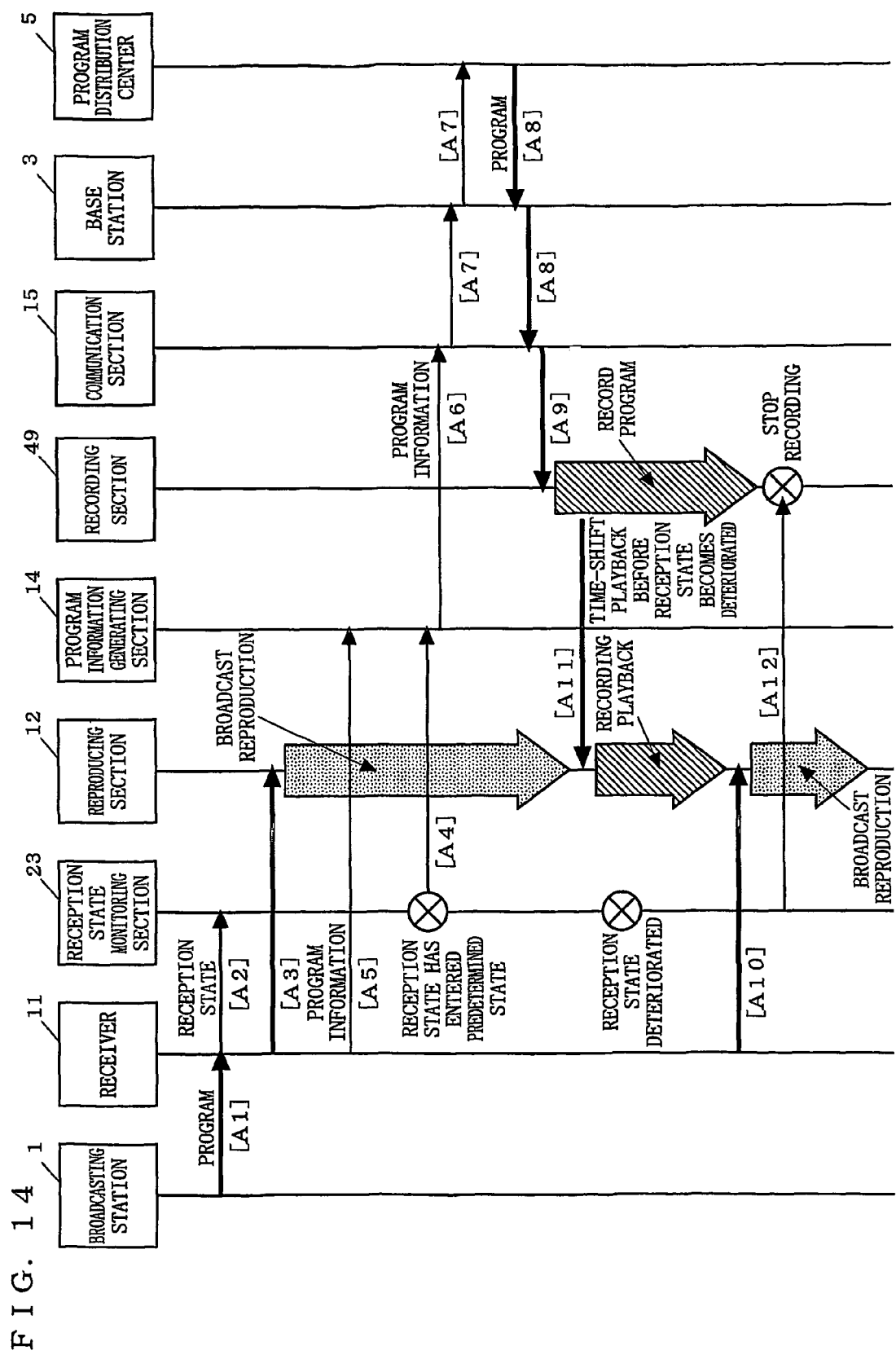
FIG. 14 is an illustration showing one example of a communication sequence of a process performed according to the flowchart of FIG. 13.

FIG. 12 is a block diagram illustrating a detailed structure of a mobile terminal 2 according to the fourth embodiment of the present invention. FIG. 13 is a flowchart showing a procedure of the program reception controlling method performed by the mobile terminal 2 according to the fourth embodiment of the present invention. FIG. 14 is an illustration showing one example of a communication sequence of a process performed according to the flowchart of FIG. 13.

In FIG. 12, the mobile terminal 2 includes a receiver 11, a reproducing section 12, a reception state monitoring section 23, a program information generating section 14, a communication section 15, a switching section 16, and a recording section 49. As can be seen from FIG. 12, the mobile terminal 2 according to the fourth embodiment is different from the mobile terminal 2 according to the above second embodiment in that the recording section 49 is further provided. Hereinafter, description is made to the mobile terminal 2 of the fourth embodiment, mainly with regard to this different component.

Upon sequentially receiving program data corresponding to the relevant program from a program distribution center 5 by streaming [A8], the communication section 15 reports the start of reception to the reception state monitoring section 23 (step S306), and also outputs the received program data to the recording section 49. The recording section 49 then records the program data received from the communication section 15 [A9] (step S1301). Then, when the reception state is deteriorated (step S303, No), in order to cause the program data recorded by the recording section 49 to be output to the reproducing section 12, the reception state monitoring section 23 controls switching of the switching section 16 (switching from broadcasting to recording playback) (step S1302). The reproducing section 12 then performs time-shift playback of the recorded program data supplied via the switching section 16 from a point preceding to the current viewing/listening point by a period of time required for switching from reproduction of the broadcast program to reproduction of the program data [A11] (step S1303). A period of time required for switching of reproduction in the reproducing section includes a period of time for changing an image setting required based on a difference in image resolution between the broadcast program received by the receiver 11 and the program data received by the communication section 15.

If it is determined that the state of reception through broadcasting has been returned to be in a satisfactory state after switching to reproduction of the recorded program data (step S310, Yes), in order to again cause the broadcast program received by the receiver 11 to be output to the reproducing section 12, the reception state monitoring section 23 controls switching of the switching section 16 (switching from recording playback to broadcasting) (step S1304). The reproducing section 12 then reproduces the broadcast program supplied via the switching section 16 [A10] (step S312). Upon completion of switching, the reception state monitoring section 23 stops recording the program data distributed from the program distribution center 5 [A12] (step S1305).

As described above, according to the mobile terminal and program reception controlling method of the fourth embodiment of the present invention, in addition to the effect of the above second embodiment which allows continuous program viewing/listening even if program reception through broadcasting becomes difficult, it is also possible to further avoid a phenomenon in which deteriorated images and/or sounds are provided to the user at the time of switching.

Furthermore, a process similar to the above-described process can be achieved by the mobile terminal according to the above third embodiment having incorporated therein the structure of the recording section 49. In this case, when the reception switching start time calculated by the reception state estimating section 38 arrives, the recording section 49 starts program recording.

Still further, in the above fourth embodiment, descriptions have been made in the case where the recording section 49 is used to seamlessly perform switching from broadcasting to communication. Alternatively, with the recording section 49 recording the broadcast program received through broadcasting, switching from communication to broadcasting can be seamlessly performed.

FIFTH EMBODIMENT

Figure 15:
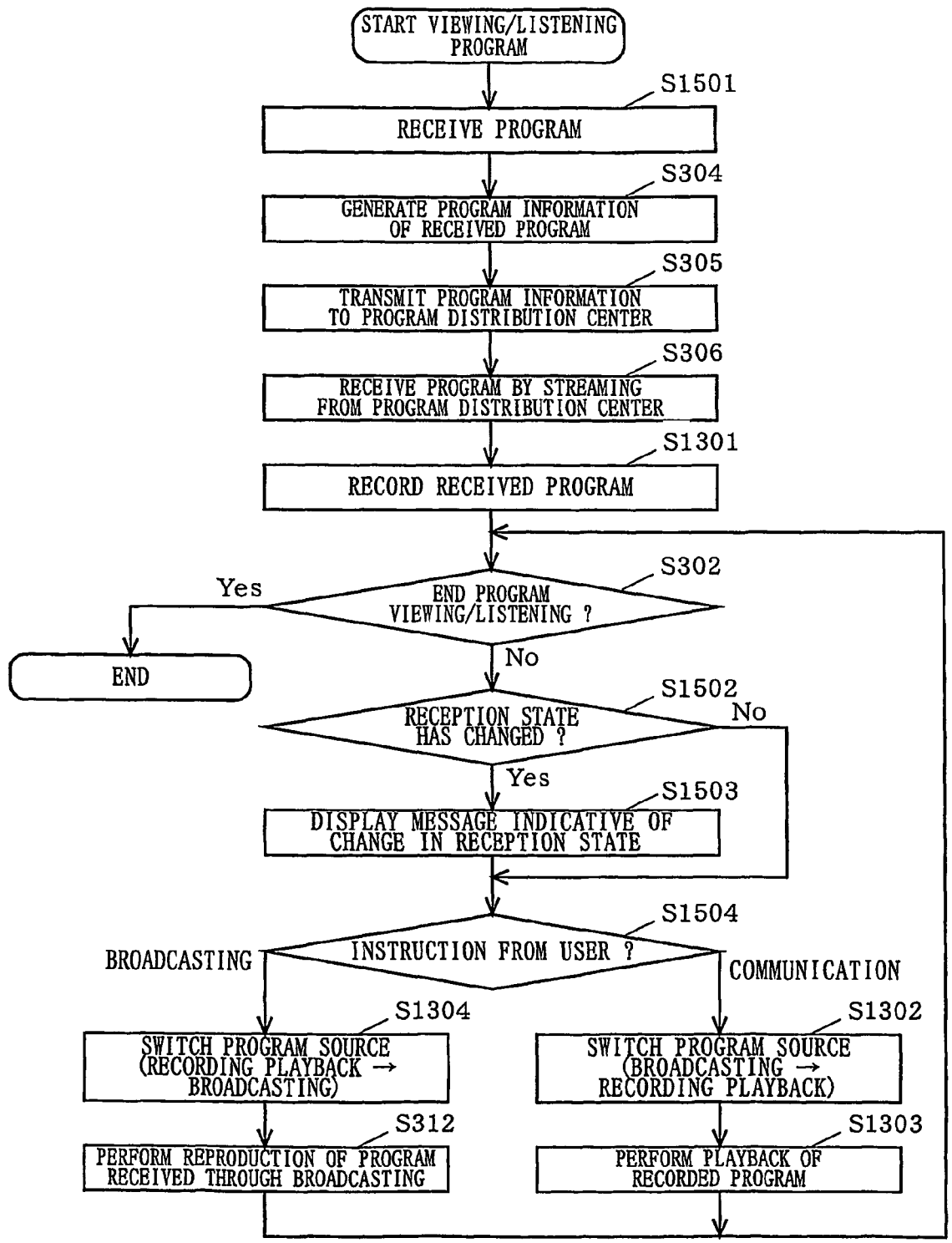
FIG. 15 is a flowchart showing a procedure of a program reception controlling method performed by a mobile terminal according to a fifth embodiment of the present invention.

In the above fourth embodiment, the recording section 49 starts program recording at a time when the reception state monitoring section 23 determines that the reception state has entered the predetermined state or at a time when the reception state estimating section 38 determines that the reception switching start time has arrived. Alternatively, the recording section 49 can start recording the received program anytime before either of the above-mentioned times, and also can continuously perform such recording. FIG. 15 is a flowchart showing a procedure of a program reception controlling method carried out by a mobile terminal which performs continuous program recording according to a fifth embodiment of the present invention.

For continuous recording of the received program (steps S1501, S304 through S306, S1301), it is possible to let the user select, for reproduction, either one of program reception through broadcasting and program reception through communication. At this time, a message "The reception state will be deteriorated" may be displayed on a screen of the mobile terminal when the reception state monitoring section 23 determines that the program reception state has entered the predetermined state or when the reception state estimating section 38 determines that the reception switching start time has arrived (steps S1502 and S1503). Also, when the broadcast waves are recovered from a deteriorated state to a satisfactory state, a message "The reception state has been recovered" may be displayed on the screen (steps S1502 and S1503). Referring to such screen display, the user can select a resource of the program to be reproduced according to the user's preference (step S1504).

Typically, the process performed by the mobile terminal described in each of the above embodiments is achieved by a CPU interpreting predetermined computer program data for executing a procedure stored in a storage device (ROM, RAM, a hard disk, etc.). In this case, such computer program data may be introduced to the storage device via a storage medium, such as a portable small memory (for example, an SD card (R)), or through downloading from a network via the base station.

The invention claimed is:

1. A mobile terminal operable to receive a broadcast program and receive program data, identical in content to the broadcast program, from a program distribution center via a network, said mobile terminal comprising:
   a receiver section operable to receive the broadcast program;
   a state determining section operable to monitor a reception state of the broadcast program received by said receiver section, and operable to determine whether the reception state of the broadcast program is a deteriorated reception state;
   a program information generating section operable to generate program information, the program information identifying the broadcast program received by said receiver section;
   a communication section operable to transmit the program information to the program distribution center, and, according to the program information transmitted to the program distribution center, operable to receive from the program distribution center the program data identical in content to the broadcast program; and
   a reproducing section operable to reproduce the broadcast program received by said receiving section until the reception state of the broadcast program has become the deteriorated reception state, and, upon a determination by said state determining section that the reception state of the broadcast program has become the deteriorated reception state, said reproducing section is operable to switch from reproduction of the broadcast program received by said receiving section to reproduction of the program data received by said communication section.

2. The mobile terminal according to claim 1, wherein said state determining section is further operable to determine whether the reception state of the broadcast program will become the deteriorated reception state within a predetermined period of time.

3. The mobile terminal according to claim 1, wherein said state determining section comprises:
   a position specifying section operable to specify a future position to which said mobile terminal will move; and
   a reception state estimating section containing information on weak-signal areas, and operable to estimate whether the future position, to which said mobile terminal will move within a predetermined period of time, will be within a weak-signal area.

4. The mobile terminal according to claim 1, further comprising:
   a recording section operable to record the program data received by said communication section, said reproducing section being operable to reproduce the program data recorded by said recording section during a period of time required for switching from the reproduction of the broadcast program to the reproduction of the program data.

5. The mobile terminal according to claim 4, wherein the period of time required for switching includes a period of time for changing an image setting required according to a difference in an image resolution between the broadcast program and the program data.

6. The mobile terminal according to claim 1, wherein the program information further includes information which identifies a reproducing point in the broadcast program at a point in time when the reception state of the broadcast program becomes a deteriorated reception state.

7. The mobile terminal according to claim 1, wherein the program information further includes information which identifies a reproducing point in the broadcast program selected by a user.

8. The mobile terminal according to claim 1, wherein, upon a determination by said state determining section that the reception state of the broadcast program has recovered from the deteriorated reception state, said reproducing section is operable to switch to reproduction of the broadcast program.

9. The mobile terminal according to claim 1,
   wherein, upon a determination by said state determining section that the reception state of the broadcast program has become a deteriorated reception state, said state determining section is operable to report the determination to a user, and
   wherein, in accordance with a switching instruction given from the user, said reproducing section is operable to continue reproduction by switching from the broadcast program to the program data.

10. A program reception controlling method performed by a mobile terminal operable to receive a broadcast program and receive program data, identical in content to the broadcast program, from a program distribution center via a network, said program reception controlling method comprising:
    receiving the broadcast program;
    determining whether a reception state of the broadcast program received by said receiving of the broadcast program is a deteriorated reception state;
    generating program information identifying the broadcast program received by said receiving of the broadcast program;
    transmitting the program information to the program distribution center, and, according to the program information transmitted to the program distribution center, receiving from the program distribution center the program data identical in content to the broadcast program received; and
    reproducing the broadcast program received by said receiving of the broadcast program until the reception state of the broadcast program has become the deteriorated reception state, and, upon a determination, by said determining of whether a reception state of the broadcast program received by said receiving of the broadcast program is a deteriorated state, that the reception state of the broadcast program received by said receiving of the broadcast program has become the deteriorated reception state switching from said reproducing of the broadcast program received by said receiving of the broadcast program to reproduction of the program data received from said receiving from the program distribution center.

11. A computer program stored in a computer-readable recording medium for causing a mobile terminal to perform program reception control, the mobile terminal operable to receive a broadcast program and receive program data, identical in content to the broadcast program, from a program distribution center via a network, said computer program stored in a computer-readable recording medium comprising:
    receiving the broadcast program;
    determining whether a reception state of the broadcast program received by said receiving of the broadcast program is a deteriorated reception state;

generating program information identifying the broadcast program received by said receiving of the broadcast program;

transmitting the program information to the program distribution center, and, according to the program information transmitted to the program distribution center, receiving from the program distribution center the program data identical in content to the broadcast program received; and reproducing the broadcast program received by said receiving of the broadcast program until the reception state of the broadcast program has become the deteriorated reception state, and, upon a determination, by said determining of whether a reception state of the broadcast program received by said receiving of the broadcast program is a deteriorated state, that the reception state of the broadcast program received by said receiving of the broadcast program has become the deteriorated reception state switching from said reproducing of the broadcast program received by said receiving of the broadcast program to reproduction of the program data received from said receiving from the program distribution center.

* * * * *